US008806467B2

(12) United States Patent
Kanokogi (10) Patent No.: US 8,806,467 B2
(45) Date of Patent: Aug. 12, 2014

(54) FIELD DEVICE MANAGEMENT APPARATUS

(75) Inventor: Hiroaki Kanokogi, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 691 days.

(21) Appl. No.: 13/096,048

(22) Filed: Apr. 28, 2011

(65) Prior Publication Data

US 2011/0276955 A1 Nov. 10, 2011

(30) Foreign Application Priority Data

May 7, 2010 (JP) ................................. 2010-107129

(51) Int. Cl.
*G06F 9/44* (2006.01)
*G06F 9/445* (2006.01)
*G06F 9/46* (2006.01)

(52) U.S. Cl.
CPC ............ *G06F 9/465* (2013.01); *G06F 9/44521* (2013.01)
USPC ........... 717/166; 717/162; 717/163; 717/165; 717/167

(58) Field of Classification Search
None
See application file for complete search history.

(56) References Cited

U.S. PATENT DOCUMENTS

| 6,094,600 | A | * | 7/2000 | Sharpe et al. | 700/19 |
| 8,060,872 | B2 | * | 11/2011 | Da Silva Neto | 717/177 |
| 2004/0093587 | A1 | * | 5/2004 | Sesma | 717/118 |

FOREIGN PATENT DOCUMENTS

JP 2010-026843 A 2/2010

OTHER PUBLICATIONS

Troelsen, "COM and .NET Interoperability," Copyright © 2002.*
Isao Hirooka et al., "FieldMate Field Device Management Tool for the New Era"; Yokogawa Technical Report,vol. 51, No. 2, 2007, pp. 45-48.
Isao Hirooka et al., "FieldMate Field Device Management Tool for the New Era", Yokogawa Technical Report English Edition, No. 44, 2007, pp. 9-12.
European Search Report dated Nov. 22, 2011, issued in corresponding European Patent Application No. 11163555.3.
Williams, Sara et al.; "The Component Object Model. The Foundation for Ole Services"; Dr. Dobb's Special Report, XX XX, vol. 19, No. 16, Dec. 21, 1994, pp. 14-22, XP002025907.

* cited by examiner

*Primary Examiner* — Insun Kang
(74) *Attorney, Agent, or Firm* — Westerman, Hattori, Daniels & Adrian, LLP (57) ABSTRACT

A field device management apparatus may include a plurality of COM in-process servers, each of which acquires and manages device data related to a corresponding one of field devices, and a launch-program COM in-process server that stores a launch-program, the launch-program activating an instance in each of the plurality of COM in-process servers, the launch-program preventing four different functions from being executed directly by an OS in the plurality of COM in-process servers. The plurality of COM in-process servers may be initialized on the Microsoft Windows operating system to generate COM objects in different memory spaces.

17 Claims, 8 Drawing Sheets

FIELD DEVICE MANAGEMENT APPARATUS

BACKGROUND OF THE INVENTION

1. Field of the Invention

The present invention relates to a field device management apparatus. Specifically, the present invention relates to a modification of the field device management apparatus that manages field devices on a personal computer with the MICROSOFT WINDOWS operating system.

Priority is claimed on Japanese Patent Application No. 2010-107129, filed May 7, 2010, the content of which is incorporated herein by reference.

2. Description of the Related Art

All patents, patent applications, patent publications, scientific articles, and the like, which will hereinafter be cited or identified in the present application, will hereby be incorporated by reference in their entirety in order to describe more fully the state of the art to which the present invention pertains.

Figure 5:
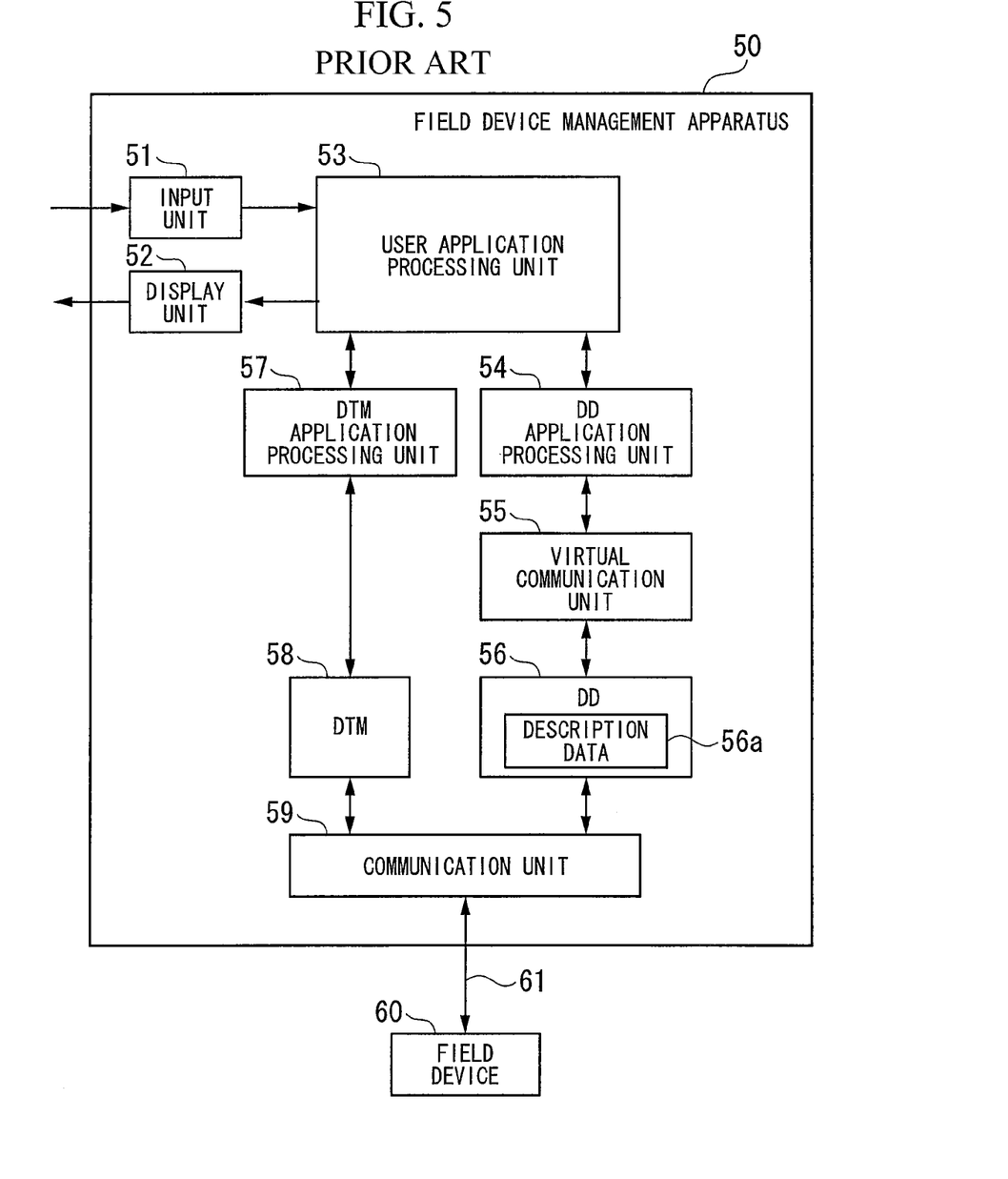
FIG. 5 is a block diagram illustrating an example of a field device management apparatus in accordance with the related art.

A field device management apparatus manages field devices included in a process control system such as a chemical plant. FIG. 5 is a block diagram illustrating an example of the field device management apparatus in accordance with the related art.

A field device management apparatus 50 communicates with a field device 60 that is a management target through a communication path 61. The field device management apparatus 50 receives device data of the field device 60 by using a device type manager (DTM) specification and a device description (DD) specification that are conventionally known. The device data is, for example, a device tag, an individual data such as a serial number, and a device parameter. The field device management apparatus 50 performs a parameter setting, a device adjustment, a maintenance operation, and so on.

As illustrated in FIG. 5, the field device management apparatus 50 includes an input unit 51, a display unit 52, a user application processing unit 53, a DD application processing unit 54, a virtual communication unit 55, a DD 56, a DTM application processing unit 57, a DTM 58, and a communication unit 59. The communication unit 59 is connected to the field device 60 through the communication path 61.

The DD 56 includes description data 56a. The description data 56a describes the device data such as a parameter of the field device 60 and a definition of a method of accessing the device data. When performing information processing such as a conditional branching processing on the parameter according to the state of the field device, the DTM 58 includes an algorithm or a program to execute the information processing. The field device management apparatus 50 receives the device data related to the field device 60 by using the DD 56 and the DTM 58.

The DD 56 is described by using a script language. Thereby, the burden of development can be reduced for manufacturers. However, it is difficult for the DD 56 to perform a complicated processing such as a conditional branching processing. Such a complicated processing is performed by the DTM 58 that utilizes the ActiveX™ control.

An operation of the field device management apparatus 50 receiving the device data from the field device 60 will be described. Initially, the user application processing unit 53 receives a device data reception request signal from a user through the input unit 51. The input unit 51 is, for example, a keyboard and a mouse.

When receiving the device data in the DD specification, the DD application processing unit 54 receives the device data reception request signal from the user application processing unit 53. The DD application processing unit 54 reads the description data 56a in the DD 56 through the virtual communication unit 55. Then, the DD application processing unit 54 communicates with the field device 60 through the DD 56, the communication unit 59 and the communication path 61, based on a definition, which is described in the description data 56a, to receive the device data from the field device 60.

The user application processing unit 53 receives the device data, which has been received by the DD application processing unit 54, to make the display unit 52 displaying the display data of the device data. The display unit 52 is, for example, a CRT (cathode ray tube) or a LCD (liquid crystal display).

When receiving the device data in the DTM specification, the DTM application processing unit 57 receives the device data reception request signal from the user application processing unit 53. The DTM application processing unit 57 activates the DTM 58. The DTM 58 communicates with the field device 60 through the communication unit 59 and the communication path 61 to receive the device data from the field device 60.

Then, the user application processing unit 53 receives the device data, which has been received by the DTM application processing unit 57, to make the display unit 52 displaying the display data of the device data.

In the field device management apparatus 50 of FIG. 5, a software library that is operated on the Windows MICROSOFT WINDOWS operation system has been used. For example, compatibility of a DD file format of the field device has been kept for more than 13 years. Also, a software library DDS (device description service), which reads the DD file electronically, has been used for more than 13 years.

Figure 6:
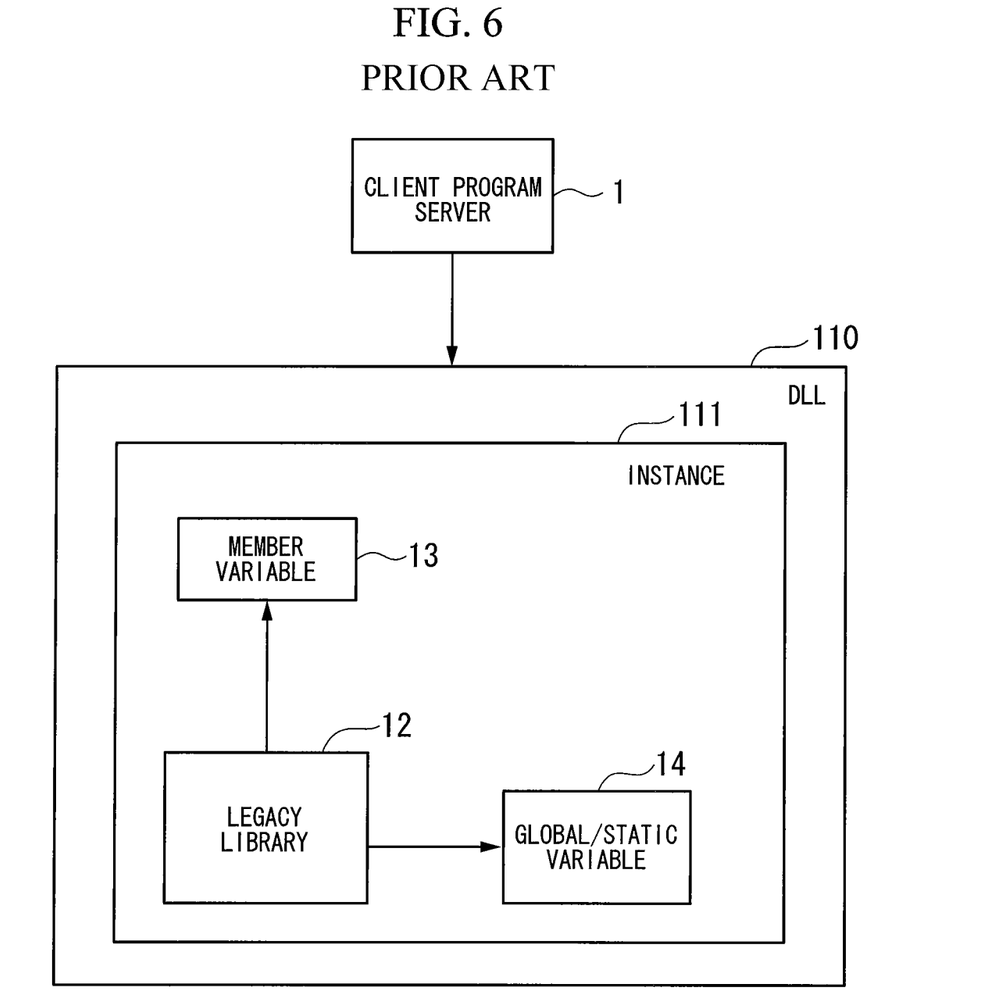
FIG. 6 is an explanatory view illustrating a normal usage of the legacy library in the field device management apparatus of FIG. 5.

The previous software library was generated by using the C programming language. Therefore, the previous software library heavily utilizes a global variable and a static variable as compared with the C++ programming language that is known as a modern programming language. FIG. 6 is an explanatory view illustrating a normal usage of the legacy library in the field device management apparatus 50 of FIG. 5.

The software library such as the DDS is set in one DLL (dynamic link library) 110 and is activated independently by a client program stored in a client program server 1. In FIG. 6, the DLL 110 includes an instance 111, which includes a legacy library 12, a member variable 13 and a global/static variable 14. The instance 111 is an object that can be manipulated by the commands of a programming language, such as a value, variable, function, or data structure.

On the other hand, there is a kind of a programming form called COM (component object model) that is a major form and is operated on the MICROSOFT WINDOWS operating system. The DTM is a standard utilizing the COM that makes it easy to use a digital field technology.

Figure 7:
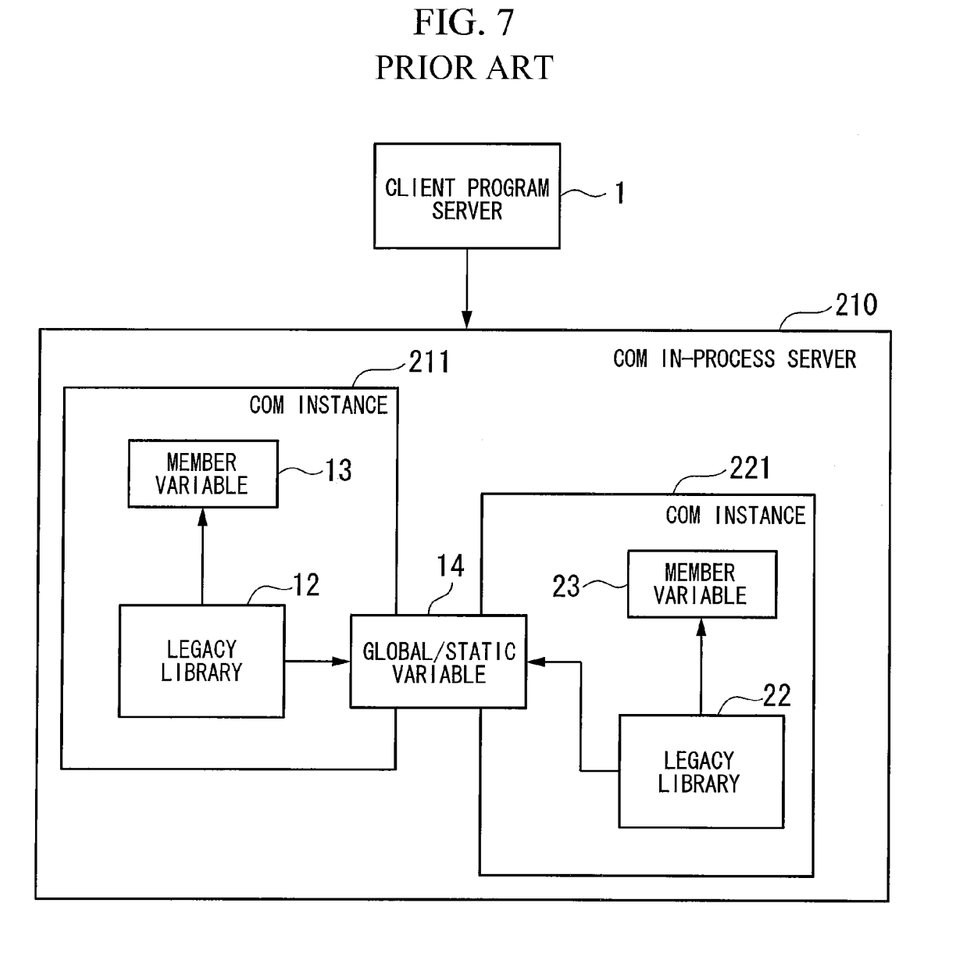
FIG. 7 is an explanatory view illustrating a usage of a DLL in the legacy library activating a plurality of COM instances in the field device management apparatus of FIG. 5.

A new trial has been done to combine a mature legacy technology such as the DDS with a new technology such as the COM. FIG. 7 is an explanatory view illustrating a usage of a DLL in the legacy library activating a plurality of COM instances in the field device management apparatus 50 of FIG. 5. When using the COM, it is general to activate a plurality of COM instances. One COM instance includes one legacy library, and a plurality of legacy libraries are activated. In the example of FIG. 7, there are two COM instances and two legacy libraries corresponding to two field devices or hardware. In FIG. 7, a COM in-process server 210 includes a COM instance 211 and a COM instance 221. The COM instance 211 includes a legacy library 12 and a member variable 13. The COM instance 221 includes a legacy library 22 and a member variable 23.

The member variable 13, the member variable 23 and a global/static variable 14 are data domains. According to the specification of the C programming language or the C++ programming language, the global/static variable 14 are treated as a common data domain in the COM in-process server 210.

In origin, the global/static variable 14 is assumed to be used by a single legacy library 12 as illustrated in FIG. 6. The global/static variable 14 is not assumed to be used as the common data domain as illustrated in FIG. 7. However, even if the C programming language is used in the development, the global/static variable 14 is used as the common data domain as illustrated in FIG. 7 in order to lower the number of man-hours in the development.

When applying the COM technology, if the global/static variable is treated in the COM in-process server as the common data domain, then the legacy library does not work properly. Therefore, either the following (1) or (2) will be selected when applying the COM technology to the legacy library.

(1) Rewriting all source codes of the legacy library to change its design so that the global/static variables are not used.

Figure 8:
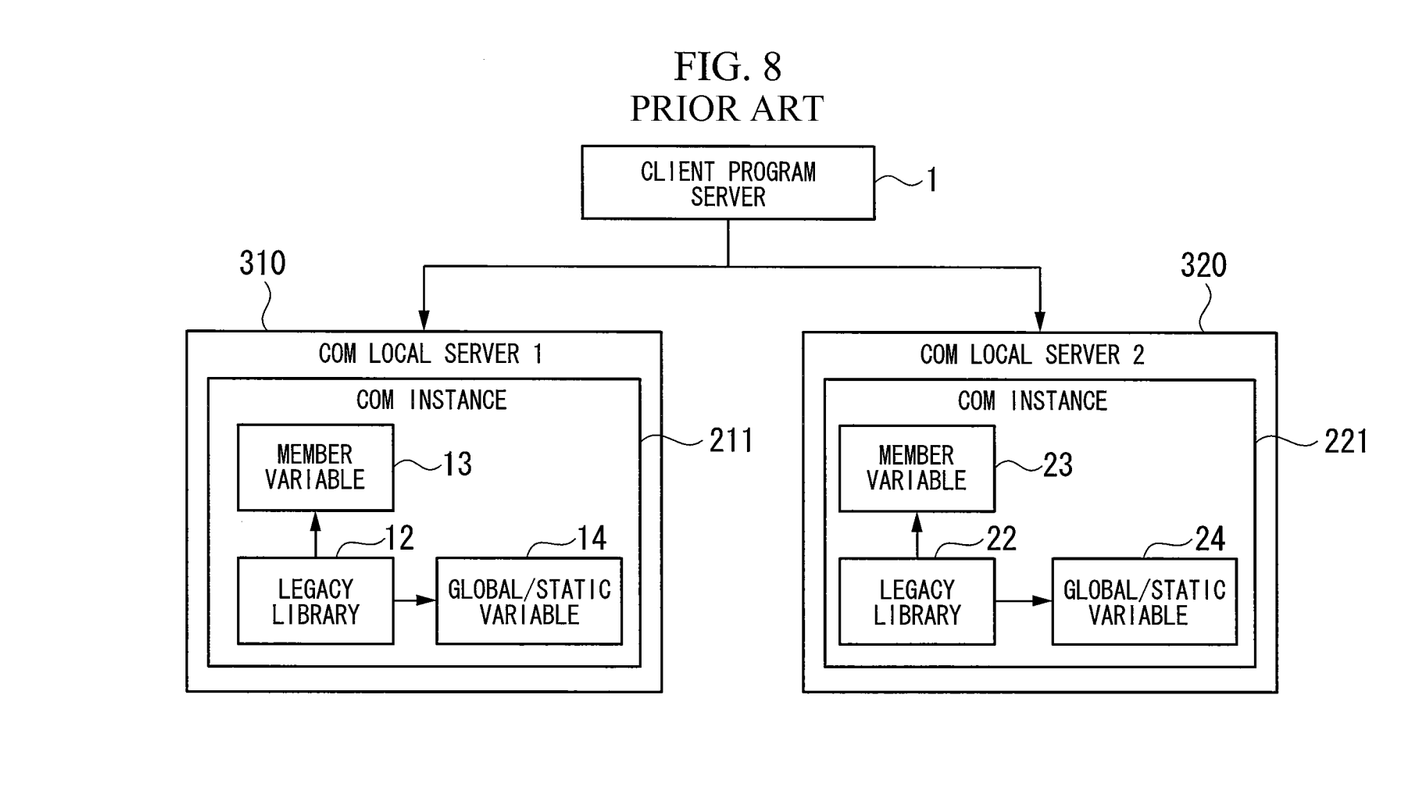
FIG. 8 is an explanatory view illustrating a usage of an EXE in the legacy library activating a plurality of COM instances in the field device management apparatus of FIG. 5.

(2) Using the EXE by changing the in-process server of FIG. 7 to the local server of FIG. 8 so that the common data domain will not occur.

FIG. 8 is an explanatory view illustrating a usage of the EXE in the legacy library activating a plurality of COM instances in the field device management apparatus of FIG. 5. A client program server 1 may include a client program. The client program is input to a COM local server 1 310 and a COM local server 2 320. The COM local server 1 310 includes a COM instance 211. The COM local server 2 320 includes a COM instance 221. In the COM instance 211, the legacy library 12 is input to a data domain of the member variable 13 and a data domain of the global/static variable 14. In the COM instance 221, the legacy library 22 is input to a data domain of the member variable 23 and a data domain of the global/static variable 24.

Japanese Unexamined Patent Application, First Publication No. 2010-026843 discloses a field device management apparatus, a field device management system, a computer program, a recoding medium and specifically, a technology of uniting applications related to a field device management.

"Isao Hirooka et al., FieldMate Field Device Management Tool for New Era, Yokogawa Technical Report English Edition, No. 44, 2007, pp. 9-12.", which is an English version of "Isao Hirooka et al., FieldMate Field Device Management Tool for New Era, Yokogawa Technical Report, Vol. 51, No. 2, 2007, pp. 45-48." in Japanese, discloses a field device management apparatus using a device description (DD) specification and a device type manager (DTM) specification.

However, the method of (1) needs to change the source code of the legacy library from an essential part, which requires a large number of man-hours. In many cases, it is impossible to change the design according to the method of (1). Specifically, the legacy library such as the DDS, which was originally made with C programming language previously, tends to overuse the global/static variable as described above. A large difficulty occurs when applying the COM technology to the legacy library.

On the other hand, in the method of (2), the legacy library itself is not changed, but the format of the COM is changed. Therefore, it requires a small number of man-hours. However, processing speed of the apparatus falls extremely.

SUMMARY

A field device management apparatus may include a plurality of COM in-process servers, each of which acquires and manages device data related to a corresponding one of the field devices, and a launch-program COM in-process server that stores a launch-program, the launch-program activating/closing an instance in each of the plurality of COM in-process servers, the launch-program preventing four different functions from being executed directly by an OS (operating system) in the plurality of COM in-process servers. The plurality of COM in-process servers may be initialized on the MICROSOFT WINDOWS operating system to generate COM objects in different memory spaces.

A field device management apparatus may include a client server including a client program, a first COM in-process server that acquires and manages device data related to a first field device, the first COM in-process server including a first COM instance, a second COM in-process server that acquires and manages device data related to a second field device, the second COM in-process server including a second COM instance, and a launch-program COM in-process server that stores a launch-program, the launch-program preventing four different functions from being executed in the first and second COM in-process servers. The first COM in-process server may be initialized on the MICROSOFT WINDOWS operating system to generate first COM objects in a first memory space in the first COM instance, and the second COM in-process server may be initialized on the MICROSOFT WINDOWS operating system to generate second COM objects in a second memory space in the second COM instance, the first memory space being different from the second memory space.

A field device management method may include acquiring and managing device data related to a corresponding one of field devices, storing a launch-program, the launch-program preventing four different functions from being executed directly by an OS, and generating COM objects in different memory spaces.

BRIEF DESCRIPTION OF THE DRAWINGS

The above features and advantages of the present invention will be more apparent from the following description of certain preferred embodiments taken in conjunction with the accompanying drawings, in which.

DETAILED DESCRIPTION OF THE PREFERRED EMBODIMENTS

The present invention will be now described herein with reference to illustrative embodiments. Those skilled in the art will recognize that many alternative embodiments can be accomplished using the teaching of the present invention and that the present invention is not limited to the embodiments illustrated herein for explanatory purposes.

A field device management apparatus may include a plurality of COM (component object model) in-process servers, each of which acquires and manages device data related to a corresponding one of the field devices, and a launch-program COM in-process server that stores a launch-program, the launch-program activating/closing an instance in each of the plurality of COM in-process servers, the launch-program preventing four different functions from being executed directly by an OS (operating system) in the plurality of COM in-process servers. The plurality of COM in-process servers may be initialized on the MICROSOFT WINDOWS operating system to generate COM objects in different memory spaces.

The launch-program may prevent a performance of a function "GetClassObject" generating a new instance.

If the function "GetClassObject" is called for the first time, then the function "GetClassObject" may be called from a body DLL (dynamic link library). If the function "GetClassObject" is called for equal to or more than the second time, then the body DLL may be copied to a copy DLL, which has a different name from the body DLL, and the function "GetClassObject" may be called from the copy DLL.

Data of the copy DLL may be stored in an array of the instance.

Only a function "CanUnloadNow" may be called at a termination time of the instance.

The four different functions may be "GetClassObject", "CanUnloadNow", "RegisterServer" and "UnregisterServer".

The COM objects may include at least one of a global variable and a static variable.

A field device management apparatus may include a client server including a client program, a first COM in-process server that acquires and manages device data related to a first field device, the first COM in-process server including a first COM instance, a second COM in-process server that acquires and manages device data related to a second field device, the second COM in-process server including a second COM instance, and a launch-program COM in-process server that stores a launch-program, the launch-program preventing four different functions from being executed in the first and second COM in-process servers. The first COM in-process server may be initialized on the MICROSOFT WINDOWS operating system to generate first COM objects in a first memory space in the first COM instance, and the second COM in-process server may be initialized on the MICROSOFT WINDOWS operating system to generate second COM objects in a second memory space in the second COM instance, the first memory space being different from the second memory space.

The launch-program may prevent a performance of a function "GetClassObject" generating a new instance.

If the client program calls the function "GetClassObject" for the first time, then the function "GetClassObject" may be called from a body DLL. If the client program calls the function "GetClassObject" for equal to or more than the second time, then the body DLL may be copied to a copy DLL, which has a different name from the body DLL, and the function "GetClassObject" is called from the copy DLL.

Data of the copy DLL may be stored in an array of the first and second COM instances.

Only a function "CanUnloadNow" may be called at a termination time of the first and second instances.

The four different functions may be "GetClassObject", "CanUnloadNow", "RegisterServer" and "UnregisterServer".

The COM objects may include at least one of a global variable and a static variable.

A field device management method may include acquiring and managing device data related to a field device, storing a launch-program, the launch-program preventing four different functions from being executed directly by an OS, and generating COM objects in different memory spaces.

The launch-program may prevent a performance of a function "GetClassObject" generating a new instance.

If the function "GetClassObject" is called for the first time, then the function "GetClassObject" may be called from a body DLL. If the function "GetClassObject" is called for equal to or more than the second time, then the body DLL may be copied to a copy DLL, which has a different name from the body DLL, and the function "GetClassObject" may be called from the copy DLL.

Only a function "CanUnloadNow" may be called at a termination time of an instance.

The four different functions may be "GetClassObject", "CanUnloadNow", "RegisterServer" and "UnregisterServer".

The COM objects may include at least one of a global variable and a static variable.

Figure 1:
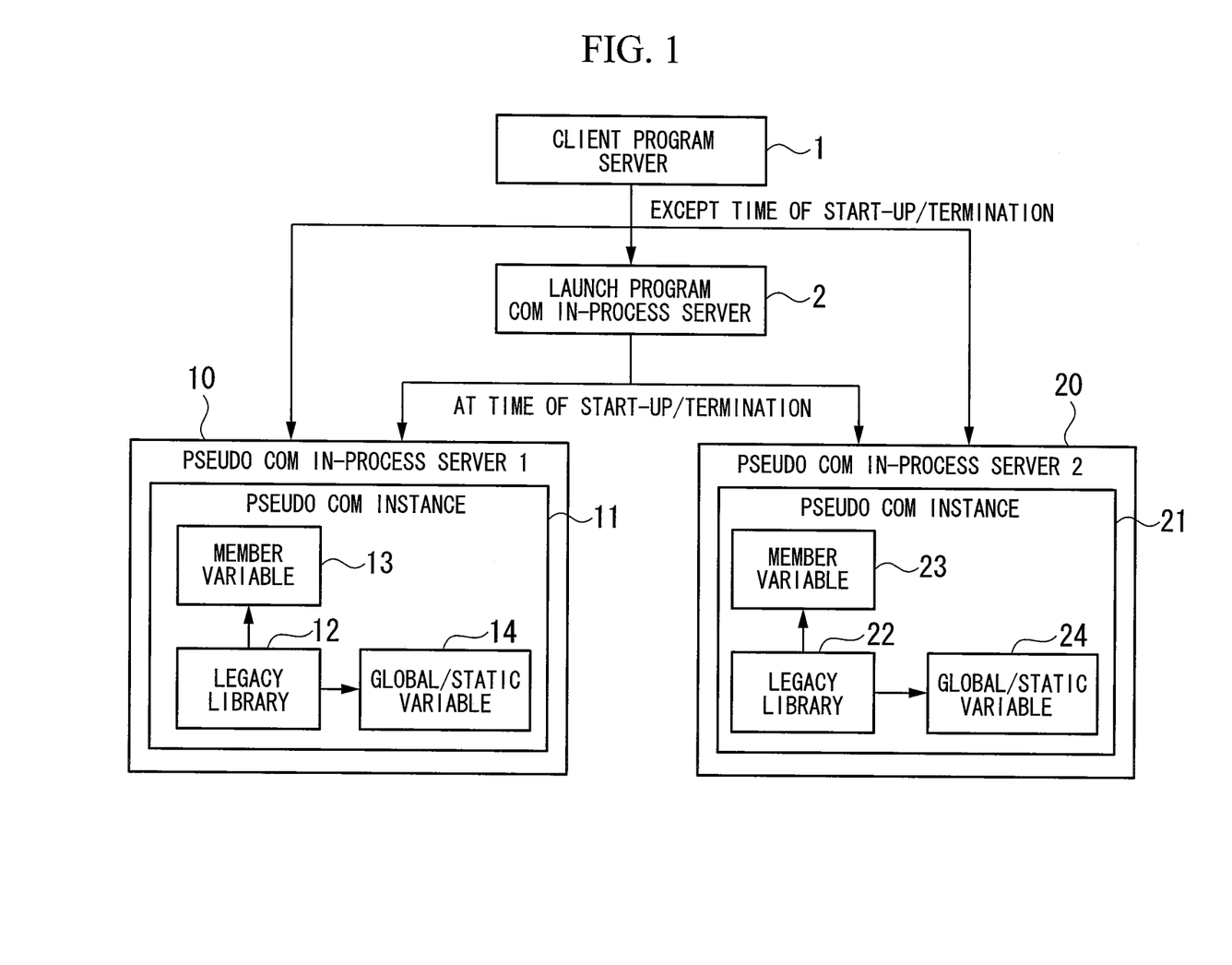
FIG. 1 is a block diagram illustrating an operation of a field device management apparatus in accordance with a first preferred embodiment of the present invention.

A first preferred embodiment of the present invention will be described. FIG. 1 is a block diagram illustrating an operation of a field device management apparatus in accordance with the first preferred embodiment of the present invention. In FIG. 1, components the same as those of FIG. 8 are designated with the same reference symbols. The difference between FIG. 1 and FIG. 8 is that a launch program COM (component object model) in-process server 2 that includes a launch program is disposed between a client program server 1 and a pseudo COM in-process server 1 10/a pseudo COM in-process server 2 20 in FIG. 1. The client program server 1 includes a client program. The client program is input to the pseudo COM in-process server 1 10 and the pseudo COM in-process server 2 20 except at the time of start-up/termination. The client program is input to the pseudo COM in-process server 1 10 and the pseudo COM in-process server 2 20 through the launch program COM in-process server 2 that includes the launch program at the time of start-up/termination. The pseudo COM in-process server 1 10 includes a pseudo COM instance 11. The pseudo COM in-process server 2 20 includes a pseudo COM instance 21. An instance is an object that can be manipulated by the commands of a programming language, such as a value, variable, function, or data structure. In the pseudo COM instance 11, the legacy library 12 is input to a data domain of the member variable 13 and a data domain of the global/static variable 14. In the pseudo COM instance 21, the legacy library 22 is input to a data domain of the member variable 23 and a data domain of the global/static variable 24.

The launch program is operated at the time of start-up/termination of the plurality of pseudo COM instances 11 and 21. The launch program activates/closes the pseudo COM instances 11 and 21. The client program is operated except at the time of start-up/termination of the plurality of pseudo COM instances 11 and 21.

In the related art, when a plurality of COM in-process servers are initialized on the MICROSOFT WINDOWS operating system, all global/static variables are generated in the common data domain as illustrated in FIG. 7. In the first preferred embodiment of the present invention, a plurality of COM objects are controlled to be generated in different memory spaces each other, even though they use in-process servers.

In the first preferred embodiment of the present invention, the following specificities (1) and (2) of the MICROSOFT WINDOWS operating system are utilized so as to achieve the above configuration without changing the conventional code at all.

(1) The functions that need to be supported by the COM in-process server are 4 functions, GetClassObject, CanUnloadNow, RegisterServer and UnregisterServer.

(2) A DLL (dynamic link library) having other file name is disposed in other memory space even if it is the same DLL.

An operation of the field device management apparatus in accordance with the first preferred embodiment of the present invention will be described. Initially, all of the 4 functions, GetClassObject, CanUnloadNow, RegisterServer and UnregisterServer, are intercepted by the launch program. In other words, the launch program calls the 4 functions so that the 4 functions are prevented from being called and executed directly by the OS (operating system). In the description below, description of the function RegisterServer and the function UnregisterServer will be omitted for these are the same as the related art. In the first preferred embodiment of the present invention, the function RegisterServer and the function UnregisterServer may be implemented in the same way as the related art.

The function GetClassObject generates a new instance. If the launch program intercepts the function GetClassObject so as not to be executed directly by the OS and the client program calls the function GetClassObject, then an operation as illustrated in FIG. 2 will be executed.

Figure 2:
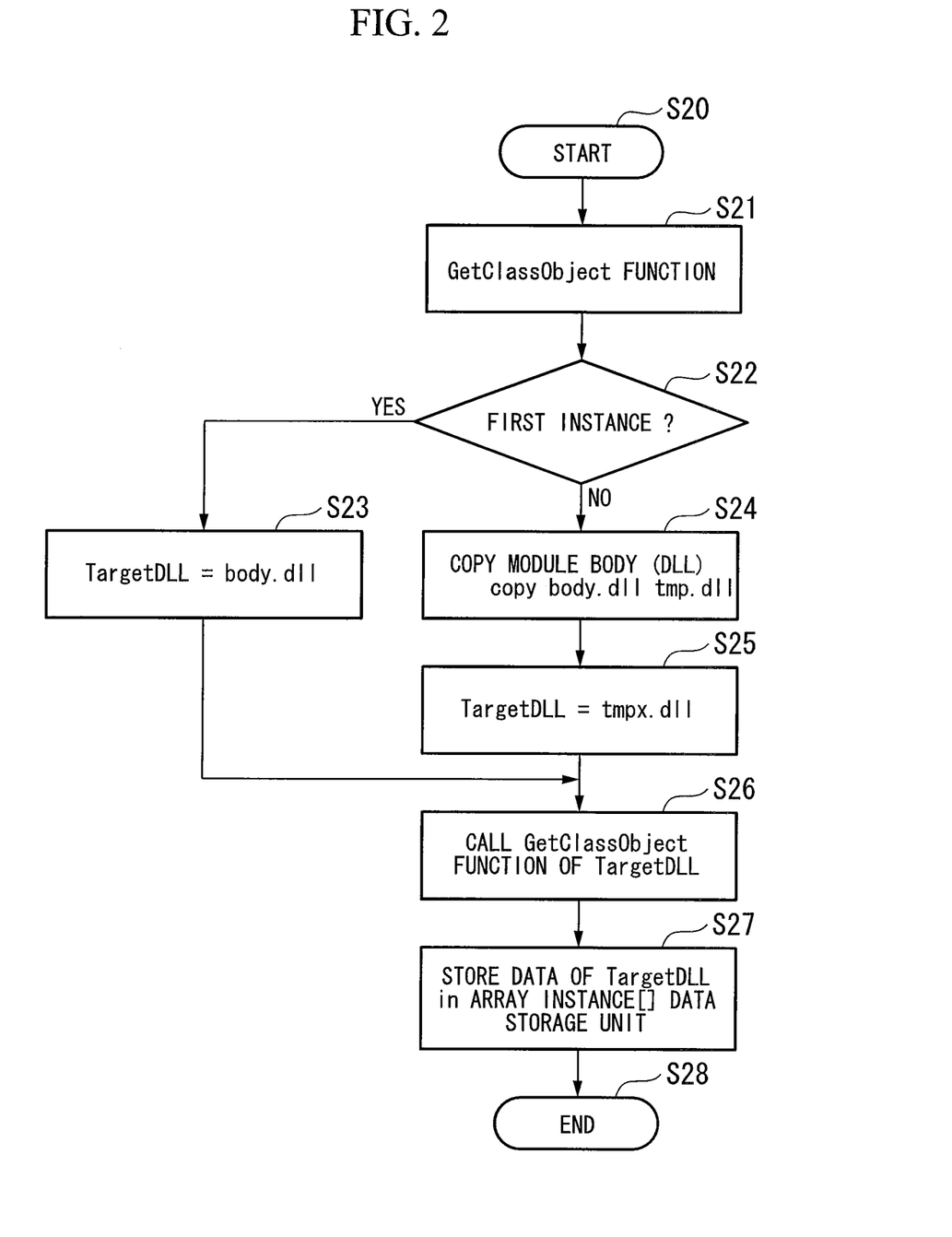
FIG. 2 is a flow chart illustrating an operation at a time of start-up of a pseudo COM instance of FIG. 1.

FIG. 2 is a flow chart illustrating an operation at a time of start-up of the pseudo COM instance of FIG. 1. In Step S20, the operation is started. In Step S21, the client program calls the function GetClassObject that is stored in the launch program. A new instance is generated based on the called function GetClassObject. In Step S22, it is determined whether or not the new instance is a first instance. If the new instance is the first instance, then the process goes to Step S23. If the new instance is not a first instance but a higher number instance, then the process goes to Step S24.

In Step S23, the launch program calls a function having the same name from the body DLL "body.dll" as target data and stores in a prescribed storage domain in the launch program. Thereby, the operation of the present invention becomes the same as the related art.

In Step S24, the body DLL "body.dll" is copied to another DLL having a unique name, for example, "tempx.dll". In Step S25, data of the copied DLL is called as target data and stored in a prescribed storage domain in the launch program. The memory space for the first instance is different from the memory space for a higher number instance, for these have different names each other.

Then the process goes to Step S26. In Step S26, the launch program calls the function GetClassObject from inside of the body DLL "body.dll" or the copied DLL "tmpx.dll", based on the target data in Step S23 or Step S25.

In Step S27, for a termination operation, data of the copied DLL "tmpx.dll" is stored in an array instance [ ] data storage unit in the launch program. The data stored in the array instance [ ] data storage unit includes first data and second data. The first data indicates whether the body DLL is used directly or the copied DLL is used. The second data indicates the file name that is used when the body DLL is copied, if the copied DLL is used. Then, in Step S28, the process ends.

Figure 3:
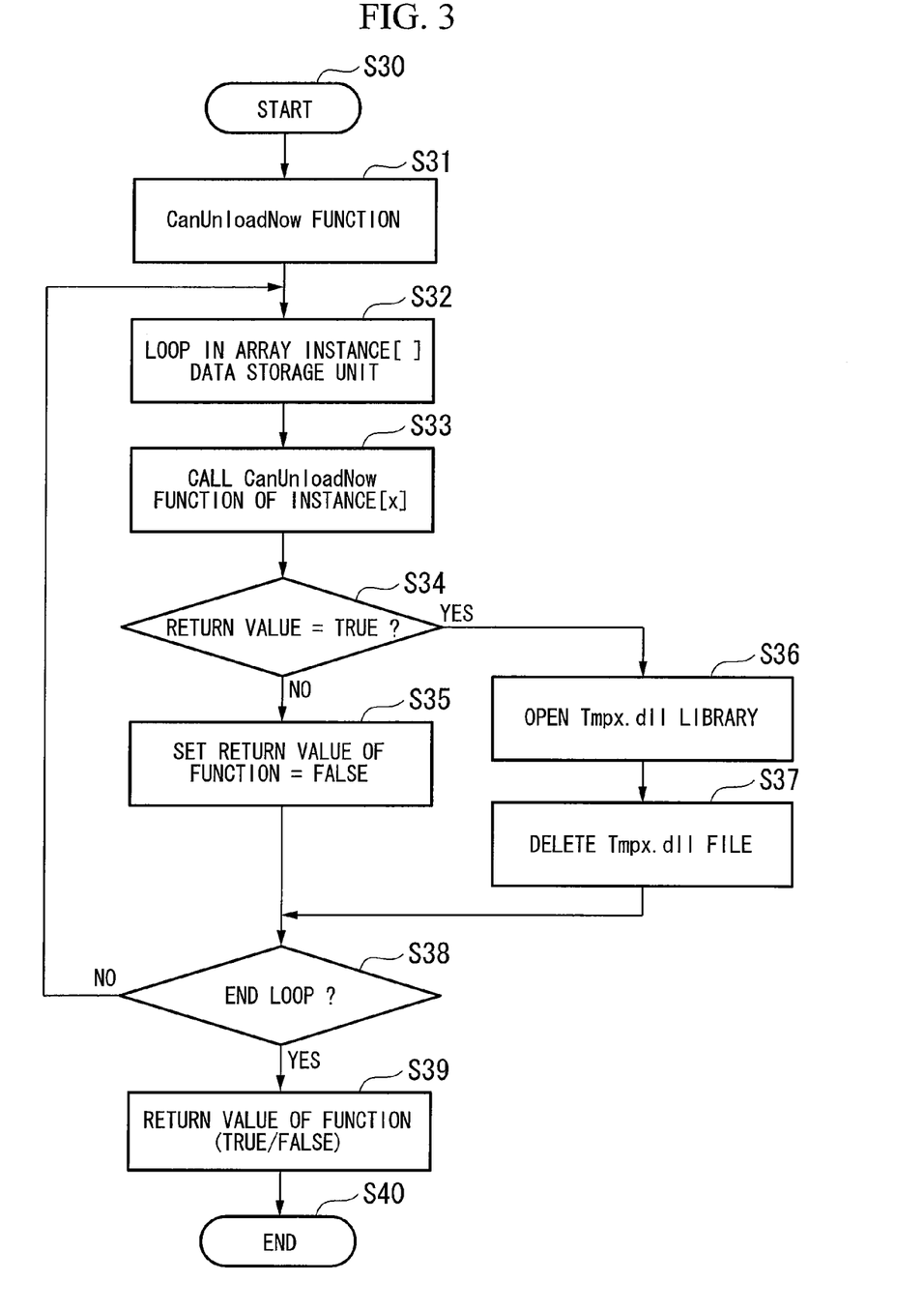
FIG. 3 is a flow chart illustrating an operation at a time of termination of the pseudo COM instance of FIG. 1.

FIG. 3 is a flow chart illustrating an operation at a time of termination of the pseudo COM instance of FIG. 1. At the termination time of the pseudo COM instance, a calling process is summarized to the function CanUnloadNow and the copied DLL "tmpx.dll" is deleted.

In Step S30 of FIG. 3, the operation is started. In Step S31, the client program calls the function CanUnloadNow that is stored in the launch program. In Step S32, the called function CanUnloadNow loops inside the array instance [ ] data storage unit. In Step S33, the function CanUnloadNow of instance [x] is called. Here, x is an array of the instance.

In Step S34, whether the return value of the called function CanUnloadNow of instance [x] is TRUE or not is determined.

If the return value is not TRUE, then the process goes to Step S35 and the return value is set as FALSE. If the return value is TRUE, then in Step S36, then the legacy library of the copied DLL "tmpx.dll" is opened, and in Step S37, the file of the copied DLL "tempx.dll" is deleted.

In Step S38, it is determined whether or not to end the loop between Step S32 and Step S35/S37. If it is determined not to end the loop, then the process goes to Step S32 and a series of operation between Step S32 and Step S37 is repeated until the loop ends. If it is determined to end the loop, then the process goes to Step S39. In Step S39, the return value TRUE/FALSE of the function CanUnloadNow is returned. Then in Step S40, the series of operation at the time of termination of the instance ends.

Figure 4:
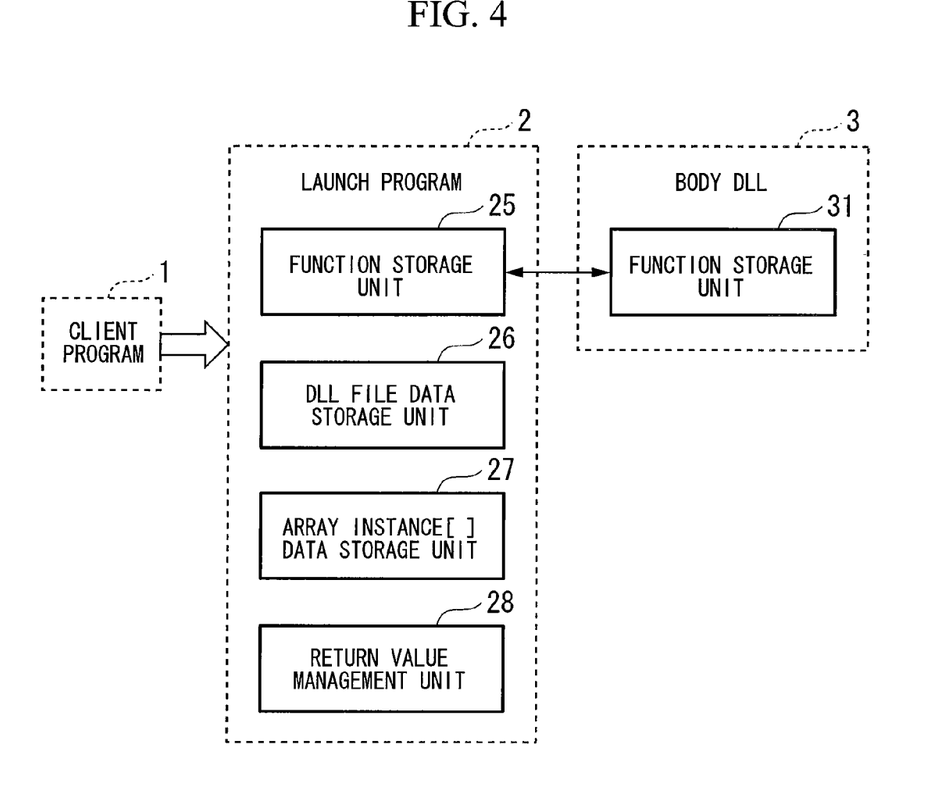
FIG. 4 is a block diagram illustrating an embodiment of a main component of the field device management apparatus of FIG. 1.

FIG. 4 is a block diagram illustrating an embodiment of a main component of the field device management apparatus of FIG. 1. The launch program 2 includes a function storage unit 25, a DLL file data storage unit 26, an array instance [ ] data storage unit 27, and a return value management unit 28. The body DLL 3 includes a function storage unit 31.

At the time of start-up, the client program calls the function GetClassObject that is stored in the function storage unit 25 of the launch program 2.

If the newly generated instance is first instance, then the launch program 2 calls the function GetClassObject from the function storage unit 31 of the body DLL 3, and stores it in the DLL file data storage unit 26 of the launch program 2.

If the newly generated instance is not a first instance, then the launch program 2 copies the body DLL into another DLL file having a unique name, and stores the file data of the copied DLL as calling target data in a different memory space from the body DLL, which is different from the memory space when the instance of the DLL file data storage unit 26 of the launch program 2 is a first instance.

For a termination process, the launch program 2 stores data of the copied DLL "tmpx.dll" in the array instance [ ] data storage unit 27 of the launch program 2. The launch program 2 calls the function GetClassObject from the function storage unit 31 of the body DLL 3, and stores it in the DLL file data storage unit 26 of the launch program 2.

At the time of termination, the client program calls the function CanUnloadNow that is stored in the function storage unit 25 of the launch program 2.

The called function CanUnloadNow loops inside the array instance [ ] data storage unit 27, and the function of CanUnloadNow of instance [x] is called.

The return value management unit 28 determines whether the return value of the called function CanUnloadNow of instance [x] is TRUE or not. If the return value is not TRUE, then the return value is set as FALSE. If the return value is TRUE, then the legacy library of the copied DLL "tmpx.dll", which is stored in the DLL file data storage unit 26, is opened, and the file of the copied DLL "tmpx.dll" is deleted.

By the above-described operation, even when the legacy library using the global/static variable is used in the COM in-process server, normal operation can be attained as in the related art.

First, the number of man-hour for the legacy library is zero, for the legacy library is not processed at all. Secondly, the executing speed is not reduced, for this is attained by the in-process server. For these two points, superior effects are provided in comparison with the related art.

In the above description of the first preferred embodiment of the present invention, an example of the field device management apparatus was described. The present invention can be applied to the case when applying the COM to a module, which includes a software library using the global/static variable.

Specifically, it is more effective when it is difficult to delete the global/static variable from an old software library or when an old software library is applied to Microsoft.NET Framework. In this case, the global/static variable often becomes a problem, but if the present invention is applied to, the old software library can be made to correspond to Microsoft .NET Framework by a small number of man-hours. Also, the number of man-hours for verification can be reduced, for codes of the body DLL are not changed.

As described above, the present invention supplies the field device management apparatus that prevents the reduction of the executing speed without changing the conventional legacy library.

As used herein, the following directional terms "forward, rearward, above, downward, right, left, vertical, horizontal, below, and transverse" as well as any other similar directional terms refer to those directions of an apparatus equipped with the present invention. Accordingly, these terms, as utilized to describe the present invention should be interpreted relative to an apparatus equipped with the present invention.

The term "configured" is used to describe a component, section or part of a device includes hardware and/or software that is constructed and/or programmed to carry out the desired function.

Moreover, terms that are expressed as "means-plus function" in the claims should include any structure that can be utilized to carry out the function of that part of the present invention.

The terms of degree such as "substantially," "about," "nearly", and "approximately" as used herein mean a reasonable amount of deviation of the modified term such that the end result is not significantly changed. For example, these terms can be construed as including a deviation of at least ±5 percents of the modified term if this deviation would not negate the meaning of the word it modifies.

The term "unit" is used to describe a component, section or part of a hardware and/or software that is constructed and/or programmed to carry out the desired function. Typical examples of the hardware may include, but are not limited to, a device and a circuit.

While preferred embodiments of the present invention have been described and illustrated above, it should be understood that these are examples of the present invention and are not to be considered as limiting. Additions, omissions, substitutions, and other modifications can be made without departing from the scope of the present invention. Accordingly, the present invention is not to be considered as being limited by the foregoing description, and is only limited by the scope of the claims.

What is claimed is:

1. A field device management apparatus comprising:
a personal computer operating with a MICROSOFT WINDOWS operating system (OS); and
a communication unit connected to field devices through a communication path, the communication unit receiving device data of the field devices,
wherein the personal computer includes a processor configured to provide:
a plurality of component object model (COM) in-process servers, each of which acquires and manages the device data related to a corresponding one of the field devices; and
a launch-program COM in-process server that stores a launch-program, the launch-program activating and closing an instance of a COM object in each of the plurality of COM in-process servers, the launch-program calling four different functions of "GetClassObject", "CanUnloadNow", "RegisterServer", and "UnregisterServer" and preventing the four different functions from being executed directly by the OS in the plurality of COM in-process servers, and
wherein the plurality of COM in-process servers are initialized on the MICROSOFT WINDOWS operating system to generate each instance of the COM object in respectively different memory spaces.

2. The field device management apparatus according to claim 1, wherein the launch-program prevents the "GetClassObject" function from generating a new instance of the COM object.

3. The field device management apparatus according to claim 2, wherein
if the "GetClassObject" function is called for the first time, then the "GetClassObject" function is called from a body DLL, and
if the "GetClassObject" function is called for equal to or more than the second time, then the body DLL is copied to a copy DLL, which has a different name from the body DLL, and the "GetClassObject" function is called from the copy DLL.

4. The field device management apparatus according to claim 3, wherein data of the copy DLL is stored in an array of the instance.

5. The field device management apparatus according to claim 1, wherein the "CanUnloadNow" function is called only at a termination time of the instance.

6. The field device management apparatus according to claim 1, wherein the COM object includes at least one of a global variable and a static variable.

7. A field device management apparatus comprising:
a personal computer operating with a MICROSOFT WINDOWS operating system (OS); and
a communication unit connected to field devices through a communication path, the communication unit receiving device data of the field devices,
wherein the personal computer includes a processor configured to provide:
a client server including a client program;
a first component object model (COM) in-process server that acquires and manages device data related to a first field device, the first COM in-process server including a first instance of a COM object;
a second COM in-process server that acquires and manages device data related to a second field device, the second COM in-process server including a second instance of the COM object; and a launch-program COM in-process server that stores a launch-program, the launch-program calling four different functions of "GetClassObject", "CanUnloadNow", "RegisterServer", and "UnregisterServer" and preventing the four different functions from being executed directly by the OS in the first and second COM in-process servers, and wherein the first COM in-process server is initialized on the MICROSOFT WINDOWS operating system to generate the COM object in a first memory space in the first COM instance, and the second COM in-process server is initialized on the MICROSOFT WINDOWS operating system to generate the COM object in a second memory space in the second COM instance, the first memory space being different from the second memory space.

8. The field device management apparatus according to claim 7, wherein the launch-program prevents the "GetClassObject" function from generating a new instance of the COM object.

9. The field device management apparatus according to claim 8, wherein
if the client program calls the "GetClassObject" function for the first time, then the "GetClassObject" function is called from a body DLL, and
if the client program calls the "GetClassObject" function for equal to or more than the second time, then the body DLL is copied to a copy DLL, which has a different name from the body DLL, and the "GetClassObject" function is called from the copy DLL.

10. The field device management apparatus according to claim 9, wherein data of the copy DLL is stored in an array of the first and second COM instances.

11. The field device management apparatus according to claim 7, wherein the "CanUnloadNow" function is called only at a termination time of the first and second instances.

12. The field device management apparatus according to claim 7, wherein the COM object includes at least one of a global variable and a static variable.

13. A field device management method comprising:
acquiring and managing device data related to a field device by each of a plurality of component object model (COM) in-process servers, the device data being acquired through a communication path to the field device;
storing a launch-program by a launch-program COM in-process server, the launch-program activating and closing an instance of a COM object in each of the plurality of COM in-process servers, the launch-program calling four different functions of "GetClassObject", "CanUnloadNow", "RegisterServer", and "UnregisterServer" and preventing the four different functions from being executed directly by a MICROSOFT WINDOWS operating system (OS); and
initializing the plurality of COM in-process servers on the MICROSOFT WINDOWS OS to generate instances of a COM object in respectively different memory spaces.

14. The field device management method according to claim 13, wherein the launch-program prevents the "GetClassObject" function from generating a new instance of the COM object.

15. The field device management method according to claim 14, wherein
if the "GetClassObject" function is called for the first time, then the "GetClassObject" function is called from a body DLL, and
if the "GetClassObject" function is called for equal to or more than the second time, then the body DLL is copied to a copy DLL, which has a different name from the body DLL, and the "GetClassObject" function is called from the copy DLL.

16. The field device management method according to claim 13, wherein the "CanUnloadNow" function is called only at a termination time of each of the instances.

17. The field device management method according to claim 13, wherein the COM object includes at least one of a global variable and a static variable.

* * * * *